United States Patent [19]

Rudin

[11] 3,933,452

[45] Jan. 20, 1976

[54] FILTER CARTRIDGE FOR SUSPENDED PARTICLES

[75] Inventor: Ernst Rudin, Arboldswil, Switzerland

[73] Assignee: H. Gertsch & Co. Aktiengesellschaft, Zurich, Switzerland

[22] Filed: Sept. 3, 1974

[21] Appl. No.: 502,474

[30] Foreign Application Priority Data

Sept. 14, 1973 Switzerland.................. 13233/73

[52] U.S. Cl. .................. 55/499; 55/501; 55/521; 55/DIG. 31; 210/493
[51] Int. Cl.² .................................. B01D 46/10
[58] Field of Search ............ 55/490, 492, 497, 499, 55/500, 495, 496, 498, 501, 514, 521, 55 DIG. 12, DIG. 31, 511; 210/493, 495

[56] References Cited
UNITED STATES PATENTS

| | | | |
|---|---|---|---|
| 3,177,637 | 4/1965 | Davis | 55/497 X |
| 3,227,592 | 1/1966 | Coates et al. | 55/499 X |
| 3,389,031 | 6/1968 | Rosaen et al. | 55/499 X |
| 3,494,113 | 2/1970 | Kinney | 55/497 X |

*Primary Examiner*—Frank W. Lutter
*Assistant Examiner*—David L. Lacey
*Attorney, Agent, or Firm*—Ladas, Parry, Von Gehr, Goldsmith & Deschamps

[57] ABSTRACT

A filter cartridge for suspended particles comprising a frame and a filter web supported by the frame, the filter web being embedded in the frame which is formed of plastic material. The outside of the filter web is provided with a support grid or wire network which is likewise embedded in the frame. The filter web and the support grid network are folded into the shape of a bellows.

4 Claims, 2 Drawing Figures

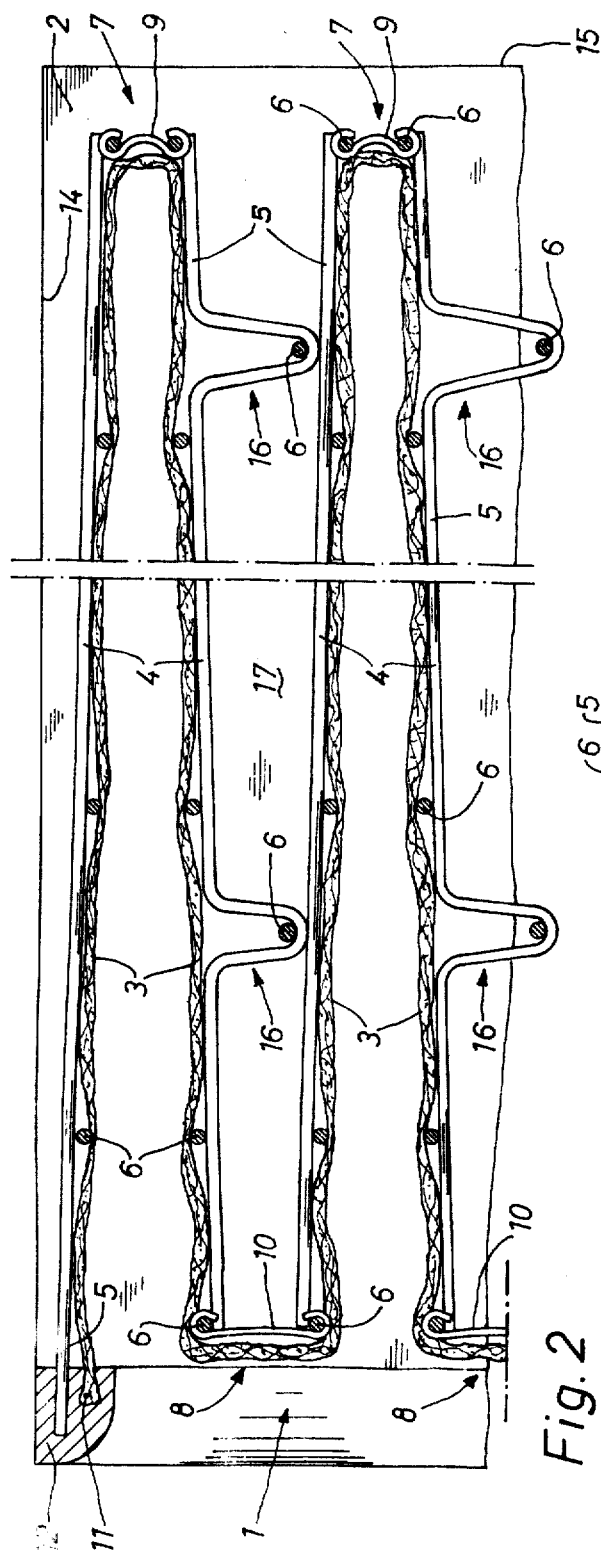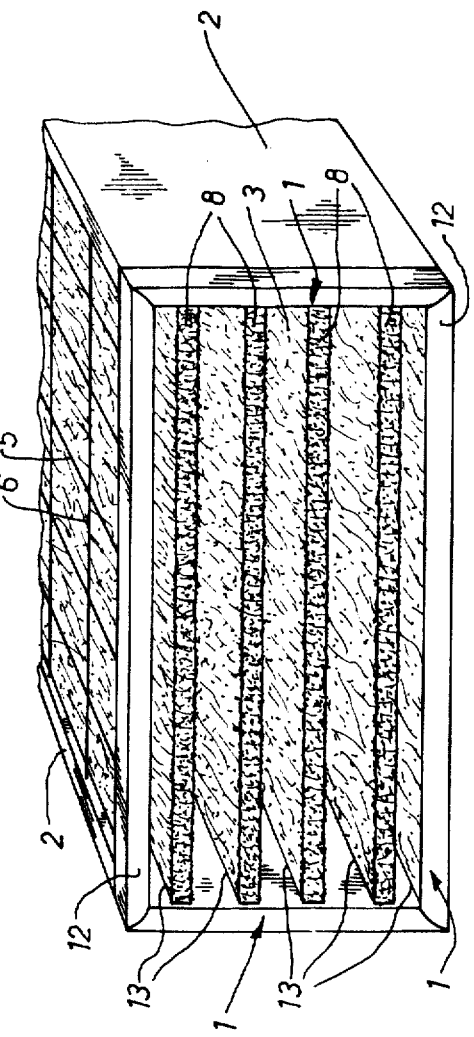

FILTER CARTRIDGE FOR SUSPENDED PARTICLES

BACKGROUND OF THE INVENTION

The present invention relates to a new and improved construction of filter cartridge for suspended particles or the like of the type incorporating a frame and a filter web supported by the frame, the filter web being embedded in the frame which is fabricated from plastic, and wherein the outside or outer surface of the filter web is equipped with a support grid network or grate which likewise is embedded in the frame.

SUMMARY OF THE INVENTION

It is a primary objective of the invention to improve such type filter cartridge which has become known to the art by virtue of its disclosure in Swiss Pat. No. 535,063, the subject matter of which is hereby incorporated by reference.

Another object of the present invention aims at improving upon the prior art filter cartridge discussed above and particularly in rendering less expensive the fabrication thereof while of course without impairing the effectiveness of the filter.

Now in order to implement these and still further objects of the invention, which will become more readily apparent as the description proceeds, the filter cartridge of this development is characterized in that the filter web is elongate and is folded along a plurality of fold regions spaced apart along the web to give it a pleated configuration, the grid means are elongate and comprise a plurality of essentially planar grids extending substantially parallel to one another with the pleats extending between respective pairs of adjacent grids, and at least one of the grids is formed with projections protruding out of the plane of the grid into the space between successive pleats of the filter web to maintain the grids and the successive pleats in spaced relationship.

By virtue of these measures it is possible to obtain a filter cartridge having a very large effective filter surface. For instance when using filter cartridges in order to provide a given effective filter surface in the wall of a building or structure, considerably fewer filter cartridges are required when using a cartridge according to the invention, having a large effective filter surface, than are required when using the heretofore known filter cartridges. The entire inlet surface of the filter of this development can be constructed to be considerably larger than the known filter cartridges. Also since the embedding of the filter web and the support grid network in the plastic frame essentially requires the same expenditure of time, regardless of whether the filter web is short or long, the fabrication costs for this purpose are approximately the same as those for fabricating the heretofore known but considerably smaller filters.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a perspective view of a filter cartridge constructed according to the invention; and FIG. 2 is a fragmentary sectional view through the filter cartridge depicted in FIG. 1.

DETAILED DESCRIPTION OF THE PREFERRED EMBODIMENTS

Describing now the drawing, the exemplary embodiment of filter cartridge of this development will be recognized to possess a substantially rectangular mouth frame portion 1 and two substantially rectangular plate-shaped side frame portions 2 forming a frame or frame means 1, 2. The mouth frame potion 1 defines an inlet opening through which a suspension to be filtered enters the filter cartridge. The filtered suspension leaves the filter cartridge by way of an outlet region defined between the side frame portions 2. This frame 1, 2 is fabricated from plastic. Within the frame 1, 2 there is arranged a filter web 3 which is folded into to form a bellows-like structure and a support grid network or grate 4 which is likewise folded into the shape of a bellows. The filter web 3 has one main surface facing the inlet opening defined by the mouth frame portion 1 and its other main surface facing the outlet region defined between the side frame portions 2. The support grid network 4 is composed of the lengthwise extending wires 5 and the transversely extending wires 6. These lengthwise- and transversely extending wires 5, 6 are welded or otherwise suitably connected with one another at their common crossover locations. The filter web 3 bears against the support grid network 4 and is adhesively bonded or otherwise appropriately connected at the common crossover locations of the wires 5 and 6. The filter web 3 is folded to form the bellows-like structure such that in the showing of FIG. 2 there are formed a number of superimposed filter web sections. These filter web sections extend from a rear deflecting or turning location 7 to a front deflecting or turning location 8 and from that location again to a rear deflecting location 7 and so forth. The filter cartridge depicted in FIGS. 1 and 2 has ten such superimposed filter web sections and four front deflecting locations 8 as well as five rear deflecting locations 7.

At each of the deflecting locations 7 and 8 there are arranged above one another two transverse extending wires 6 which are connected with one another by means of the clamps 9 and 10 respectively. Since the lengthwise extending wires 5 do not extend about the deflecting or turning locations 7 and 8, rather in each instance terminate at the last-mentioned two transverse extending wires 6 the clamps 9 and 10 hold together the individual support grid network sections. The filter web 3 extends of course without interruption over and about the deflecting location 7 and 8. Both ends 11 of the filter web 3 are embedded in the lower and upper horizontally extending frame struts or beams 12 of the mouth frame portion 1. The same is also the case for the lengthwise extending wires 5 at both ends of the support grid network 4.

In FIG. 2 there has only been illustrated the upper strut 12 with the embedded upper support grid network end and the upper filter web end. The transversely extending wires 6 of the support grid network and the lengthwise edges 13 of the filter web 3 are embedded in the same manner in both of the side frame portions 2. As also best seen by referring to FIG. 2 the side frame portions 2 extend both in height as well as also in depth over and past the folded filter web 3 and the support grid network or grate 4. In the elevational or height direction the side frame portions 2 are limited or bounded by the edges 15.

As best seen by referring to FIG. 2 the support grid network 4 possesses a number of projections 16 which extend out of the plane of the grid network or grate. These projections are located in the intermediate spaces 17 enclosed between the planes of adjacent sections of the grid network and serve to maintain in spaced relationship neighbouring filter web- and support grid network sections. The projections or protuberances 16 are formed from the lengthwise extending wires 5 of the support grid network 4. The lengthwise extending wires 5 are formed for this purpose into the depicted loops and in each such loop there is again located a transverse extending wire 6.

The filter web is fabricated at a production machine in very large lengths. For the fabrication of the filter cartridge a correspondingly long filter web section or piece is cut from one such large length. In the series or mass production it is possible to also fabricate the support grid network or grate in a continuous manner in that actually always sections of the lengthwise extending wires 5 provided with the transversely extending wires 6 follow in succession in the lengthwise direction of the grid network and such support grid network sections are connected with one another by clamps 9 and 10. With such continuous fabrication there is also undertaken the bending of the lengthwise extending wires for forming the projections 16. From such continuous fabrication of the supporting grid network there is again removed a support grid network of appropriate length, and this network is covered with the previously discussed filter web section. The crossover locations of the wires 5 and 6 are previously provided with adhesive, so that now the filter web which is located in an extended or stretched state adheres at the stretched locations at the support grid network. Now the support grid network can be simply folded to form the bellows-like structure depicted in FIG. 2. In this position the folded filter web and the folded support grid network with its lengthwise extending edges 13 and with its transverse extending wires 6 are brought into a mold. In the latter there is then introduced plastic for forming the side frame portions 2. With this molding operation the ends of the transverse extending wires 6 and the lengthwise edges 13 of the filter web are embedded in the plastic. The thus formed structure is then erected on its front side and there is then formed the mouth frame portion 1.

While there is shown and described present preferred embodiments of the invention, it is to be distinctly understood that the invention is not limited thereto, but may be otherwise variously embodied and practiced within the scope of the following claims.

Accordingly, what is claimed is:

1. A filter cartridge for filtering suspended particles from a fluid passing through the cartridge, comprising:
    a frame defining an inlet opening for admitting fluid to be filtered and an outlet region for permitting filtered fluid to leave the frame;
    grid means positioned in the frame and having peripheral portions embedded therein;
    an elongate filter web positioned in the frame and having peripheral portions embedded therein, the web being supported and backed by the grid means and having one main surface facing towards said inlet opening and its other main surface facing towards the grid means and said outlet region so that fluid to be filtered passes through the web in the direction from said one main surface towards said other main surface,
    the grid means being elongate and comprising a plurality of essentially planar grids extending substantially parallel to one another away from the inlet opening and secured together end-to-end by clamps, and the web being folded along a plurality of fold regions spaced apart along the web to give it a pleated configuration with the pleats extending between respective pairs of adjacent grids, at least one of said grids being formed with a projection protruding out of the plane of the grid into the space between successive pleats of the filter web to maintain the grids and said successive pleats in spaced relationship.

2. The filter cartridge as defined in claim 1, wherein said frame is formed of plastic.

3. The filter cartridge as defined in claim 1, wherein said frame comprises a substantially rectangular mouth frame portion and two substantially rectangular plate-shaped side frame portions, said side frame portions extending over the entire depth of said filter web.

4. The filter cartridge as defined in claim 1, wherein said grids are made of wire and said projection is formed from a wire of that grid which is formed with the projection.

* * * * *